US010630627B2

(12) United States Patent
Wills et al.

(10) Patent No.: US 10,630,627 B2
(45) Date of Patent: Apr. 21, 2020

(54) METHOD, APPARATUS AND COMPUTER PROGRAM PRODUCT FOR METADATA SEARCH IN A GROUP BASED COMMUNICATION PLATFORM

(71) Applicant: Slack Technologies, Inc., San Francisco, CA (US)

(72) Inventors: Joshua Wills, San Francisco, CA (US); Paul Lloyd, Berkeley, CA (US); Serguei Mourachov, Vancouver (CA); Neil Walker, Kings Beach, CA (US)

(73) Assignee: SLACK TECHNOLOGIES, INC., San Francisco, CA (US)

( * ) Notice: Subject to any disclaimer, the term of this patent is extended or adjusted under 35 U.S.C. 154(b) by 122 days.

(21) Appl. No.: 16/010,891

(22) Filed: Jun. 18, 2018

(65) Prior Publication Data
US 2019/0386945 A1 Dec. 19, 2019

(51) Int. Cl.
*G06F 17/30* (2006.01)
*H04L 12/58* (2006.01)
*G06F 16/33* (2019.01)

(52) U.S. Cl.
CPC ............ *H04L 51/18* (2013.01); *G06F 16/334* (2019.01)

(58) Field of Classification Search
CPC ......... H04L 51/18; H04L 51/16; H04L 45/22; H04L 45/12; G06F 16/334; G06F 17/30; G06F 16/22; G06F 16/33; G06F 16/24
USPC ........................................................ 709/206
See application file for complete search history.

(56) References Cited

U.S. PATENT DOCUMENTS

| 2013/0218896 A1* | 8/2013 | Palay ...................... H04L 51/16 707/741 |
| 2015/0199440 A1* | 7/2015 | Roeder ................... H04L 51/16 707/692 |
| 2018/0287982 A1 | 10/2018 | Draeger et al. |

OTHER PUBLICATIONS

Matsumoto, T. et al., "Chocoa Communicator—A New Communication System Based on Awareness and Text Communications—", Fujitsu Sci. Tech. J., 36, 2, (Dec. 2000) 154-161.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.
Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

(Continued)

*Primary Examiner* — Tu T Nguyen
(74) *Attorney, Agent, or Firm* — Alston & Bird LLP

(57) ABSTRACT

Method, apparatus and computer program product for querying a group-based communication platform are described herein. For example, the apparatus comprises at least one processor and at least one non-transitory memory including program code. The at least one non-transitory memory and the program code are configured to, with the at least one processor, cause the apparatus to at least store a plurality of electronic messages to a message corpus; receive a search query associated with the message corpus, wherein the search query comprises reaction metadata criteria; and apply the search query to the message corpus to generate a reaction search results set.

20 Claims, 9 Drawing Sheets

(56) References Cited

OTHER PUBLICATIONS

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Mike Issac, "Slack, a Start-Up With an App to Foster Business Collaboration, Is Valued at $1.1 Billion", The New York Times Blogs (BTIS), Lexisnexis, https://advance.lexis.com/api/permalink/3eb84b34-a8f9-4d7d-9573-89d9598a4963/?context=1000516>. (dated Oct. 31, 2014) 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Matthew Ingram, "Flickr co-founder launches Slack, an all-in-one messaging tool designed to kill email forever", GIGAOM, Lexisnexis, https://advance.lexis.com/api/permalink/0b676b7c-aec3-4560-861e-d030d1dd008c/?context=1000516, (dated Feb. 12, 2014, 7:03 PM), 2 pages.

Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 4 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.

Ernie Smith, "Picking Up the Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.

David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

\* cited by examiner

METHOD, APPARATUS AND COMPUTER PROGRAM PRODUCT FOR METADATA SEARCH IN A GROUP BASED COMMUNICATION PLATFORM

BACKGROUND

Applicant has identified many deficiencies and problems associated with existing methods, apparatus, and systems related to a group-based communication platform. Through applied effort, ingenuity, and innovation, many of these identified deficiencies and problems have been solved by developing solutions that are in accordance with embodiments of the present disclosure, many examples of which are described in detail herein.

BRIEF SUMMARY

In general, embodiments of the present invention provide methods, apparatus, systems, computing devices, and/or the like for facilitating metadata search in a group-based communication platform.

In accordance with one aspect, an apparatus is provided. The apparatus comprises at least one processor and at least one non-transitory memory including program code. The at least one non-transitory memory and the program code are configured to, with the at least one processor, cause the apparatus to at least generate a message corpus based on a plurality of electronic messages, wherein each of the plurality of electronic messages is associated with a message metadata set, each message metadata set comprising: a group identifier, a message sender identifier, a group-based communication channel identifier, and wherein at least some message metadata sets associated with respective electronic messages of the plurality of electronic messages further comprise: a reaction identifier, and a reaction sender identifier; generate a message index based on the message corpus; receive a search query associated with the message index, wherein the search query comprises reaction metadata criteria; and apply the search query to the message index to generate a reaction search results set, wherein the reaction search results set is determined at least in part by comparing, based on the message index, the reaction metadata criteria to the message metadata sets associated with the plurality of electronic messages of the message corpus.

In accordance with another aspect, the reaction metadata criteria comprises a targeted reaction identifier, and wherein the reaction search results set is determined at least in part by comparing, based on the message index, the targeted reaction identifier to the message metadata sets associated with the plurality of electronic messages of the message corpus.

In accordance with another aspect, the reaction metadata criteria further comprises a targeted reaction sender identifier, and wherein the reaction search results set is determined at least in part by comparing, based on the message index, the targeted reaction identifier and the targeted reaction sender identifier to the message metadata sets associated with the plurality of electronic messages of the message corpus.

In accordance with another aspect, each of the at least some message metadata sets further comprises a sentiment score associated with the reaction identifier, wherein the reaction metadata criteria indicates a sentiment score threshold.

In accordance with another aspect, the at least one non-transitory memory and the program code configured to, with the at least one processor, cause the apparatus to further: receive at least one additional message metadata set associated with the plurality of electronic messages, wherein the at least one additional message metadata set comprises additional reaction identifiers and additional reaction sender identifiers; and update the message index based on the at least one additional message metadata set.

In accordance with another aspect, updating the message index comprises: generating a job queue associated with the at least one additional message metadata set; and generating an updated message index based on the message index and the job queue.

In accordance with another aspect, generating the updated message index further comprises: identifying a corresponding group-based communication channel identifier and a corresponding message time stamp associated with an additional reaction identifier of the additional reaction identifiers; identifying an electronic message from the message corpus based on the corresponding group-based communication channel identifier and the message time stamp; and generating a modified electronic message by injecting the additional reaction identifier and a corresponding reaction sender identifier to the electronic message.

In accordance with another aspect, a computer-implemented method is provided. The computer-implemented method comprises generating a message corpus based on a plurality of electronic messages, wherein each of the plurality of electronic messages is associated with a message metadata set, each message metadata set comprising: a group identifier, a message sender identifier, a group-based communication channel identifier, and wherein at least some message metadata sets associated with respective electronic messages of the plurality of electronic messages further comprise: a reaction identifier, and a reaction sender identifier; generating a message index based on the message corpus; receiving a search query associated with the message index, wherein the search query comprises reaction metadata criteria; and applying the search query to the message index to generate a reaction search results set, wherein the reaction search results set is determined at least in part by comparing, based on the message index, the reaction metadata criteria to the message metadata sets associated with the plurality of electronic messages of the message corpus.

In accordance with another aspect, a computer program product is provided. The computer program product comprises at least one non-transitory computer-readable storage medium having computer-readable program code portions stored therein. The computer-readable program code portions comprises an executable portion configured to: generate a message corpus based on a plurality of electronic messages, wherein each of the plurality of electronic messages is associated with a message metadata set, each message metadata set comprising: a group identifier, a message sender identifier, a group-based communication channel identifier, and wherein at least some message metadata sets associated with respective electronic messages of the plurality of electronic messages further comprise: a reaction identifier, and a reaction sender identifier; generate a message index based on the message corpus; receive a search query associated with the message index, wherein the search query comprises reaction metadata criteria; and apply the search query to the message index to generate a reaction search results set, wherein the reaction search results set is determined at least in part by comparing, based on the message index, the reaction metadata criteria to the message metadata sets associated with the plurality of electronic messages of the message corpus.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
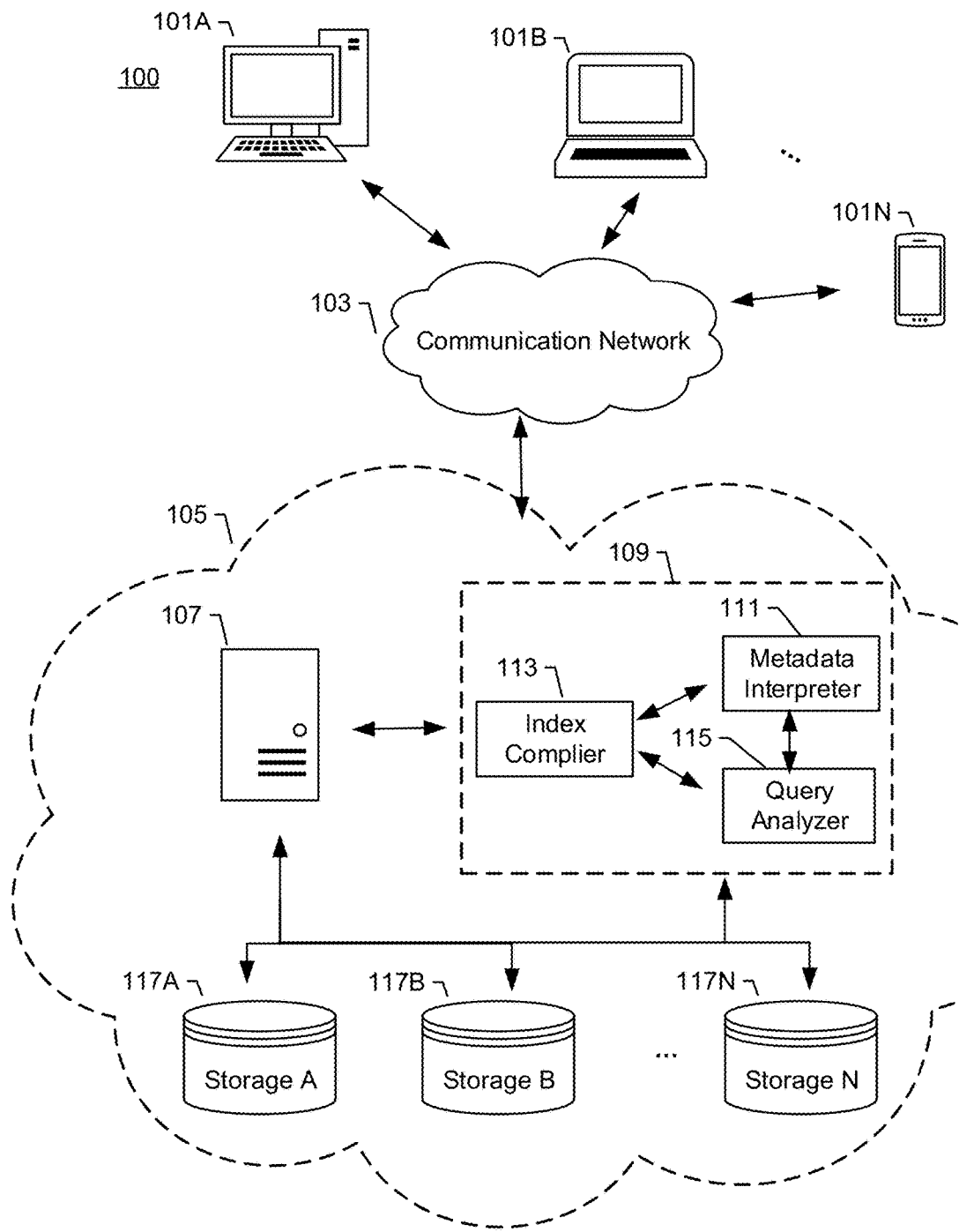
Figure 2:
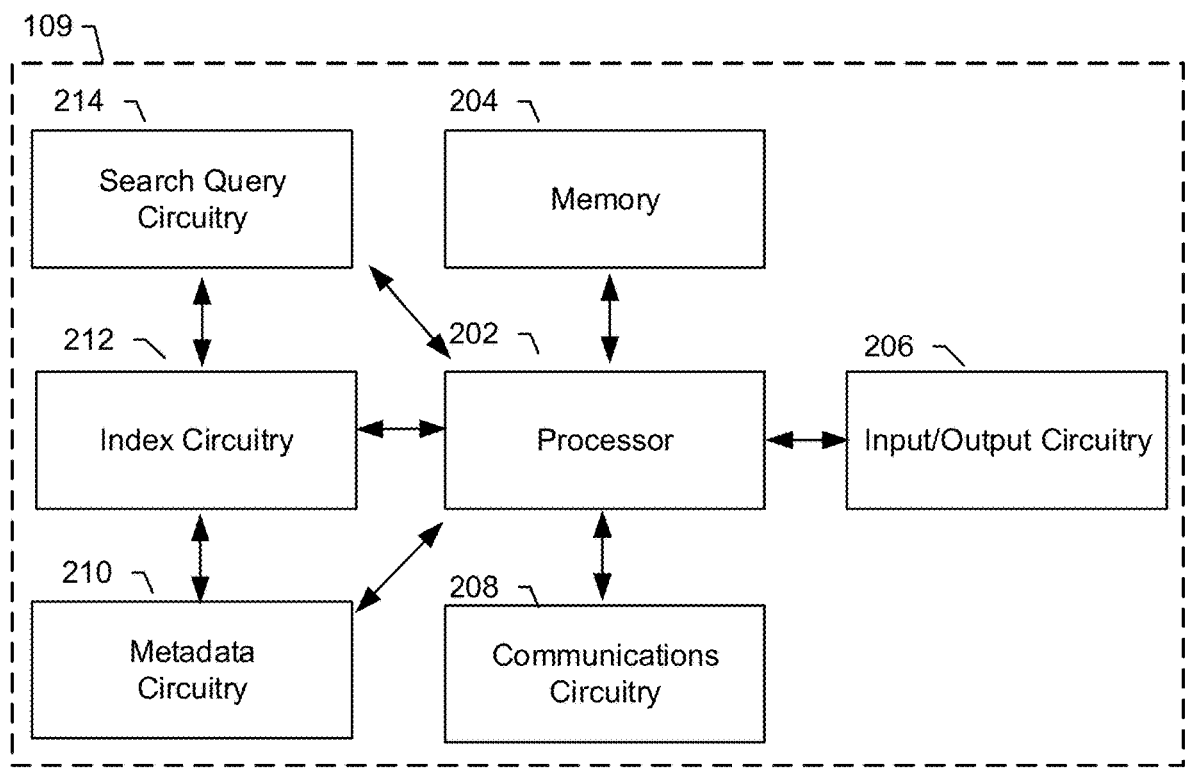
Figure 3:
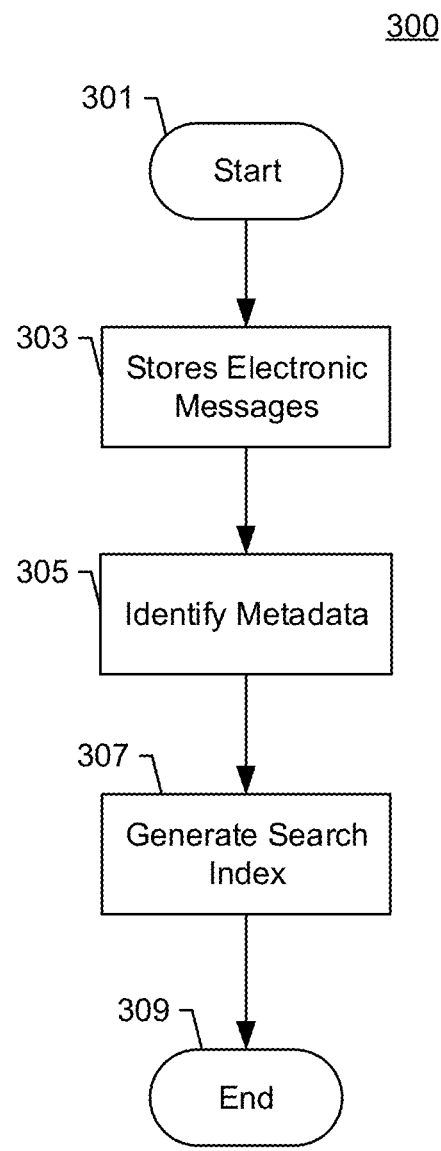
Figure 4:
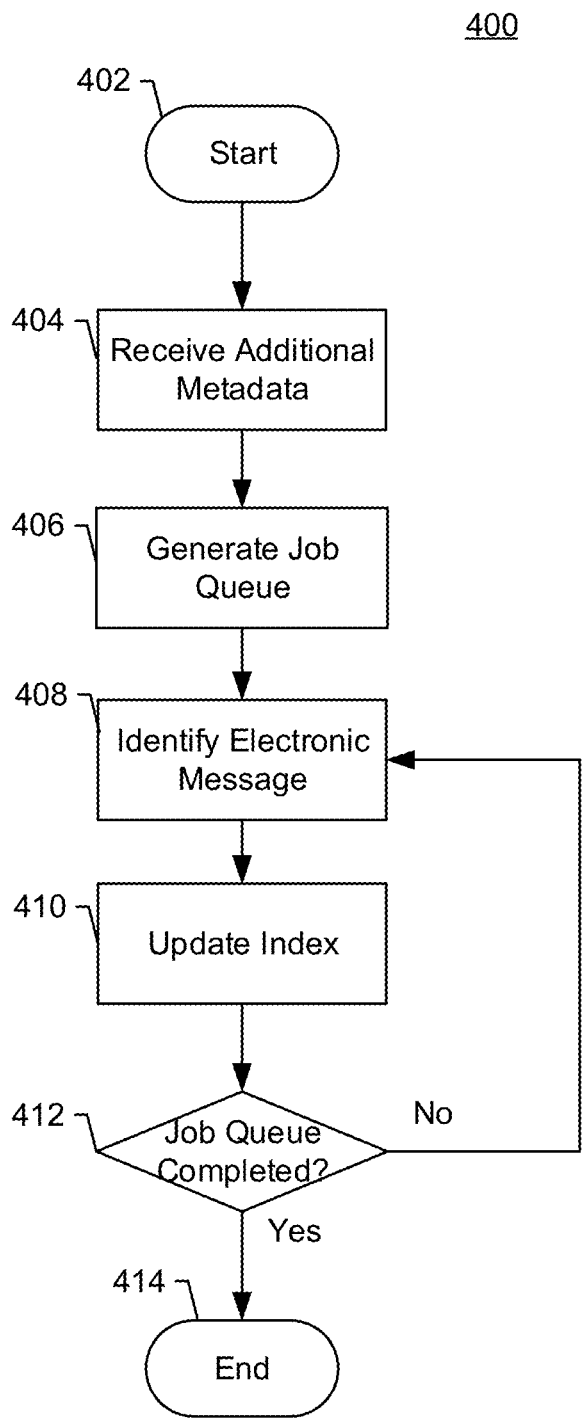
Figure 5:
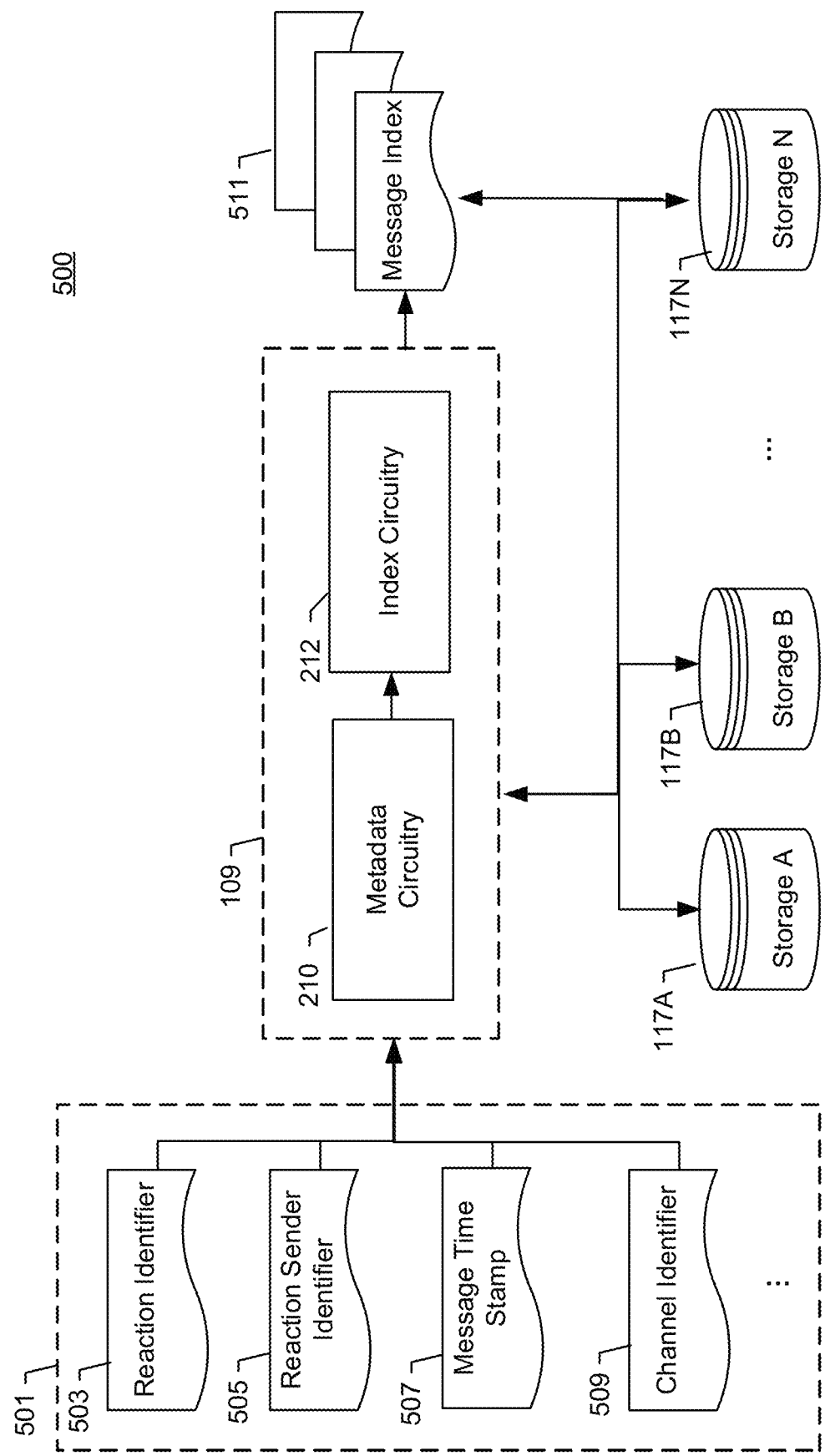
Figure 6:
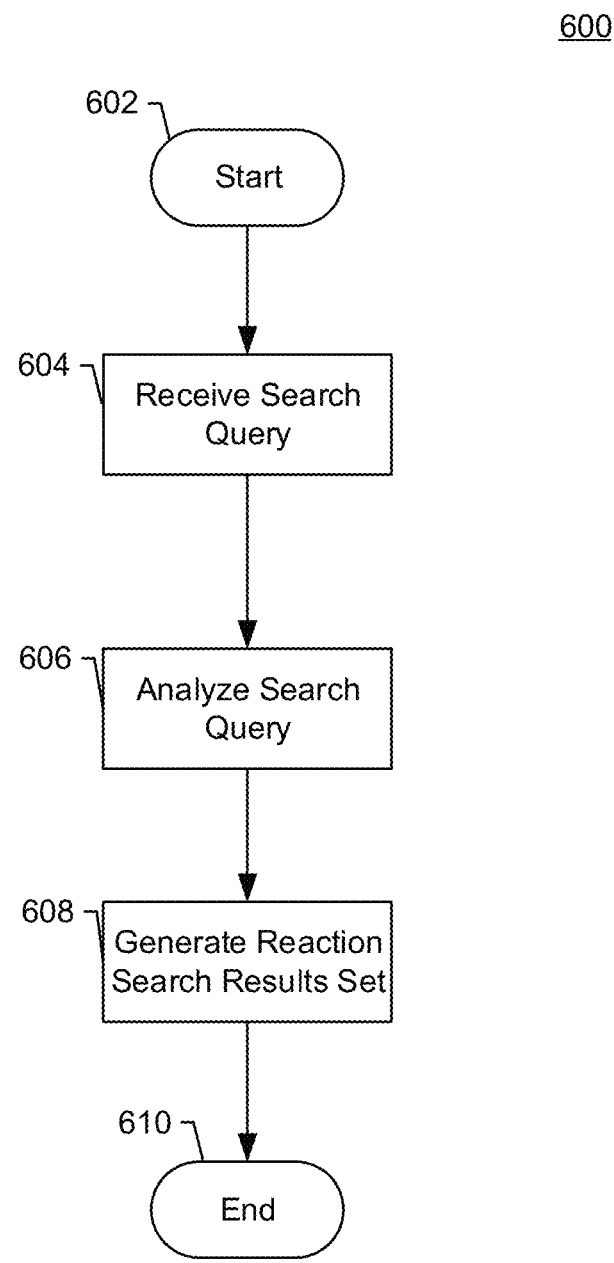
Figure 7:
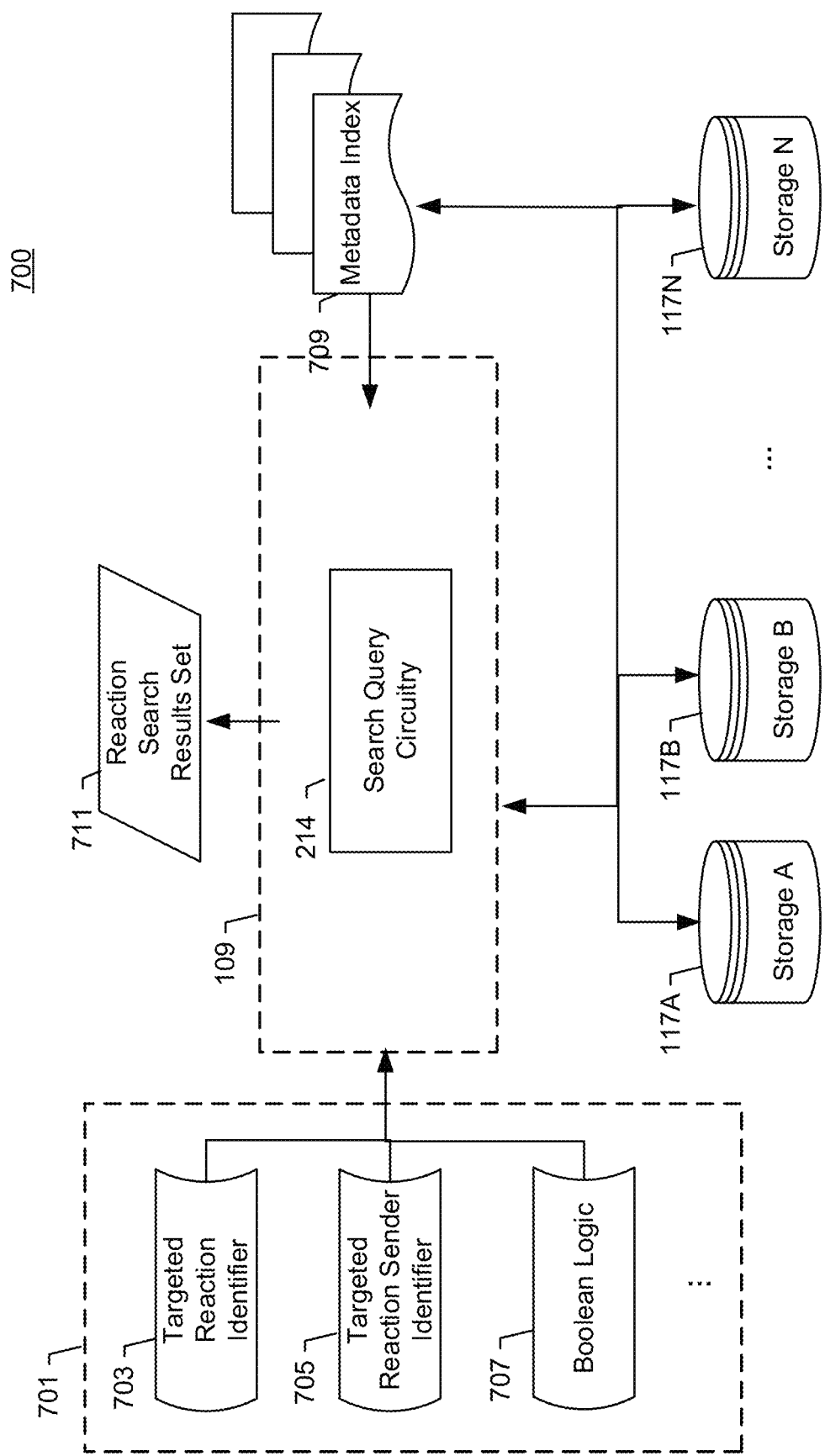
Figure 8A:
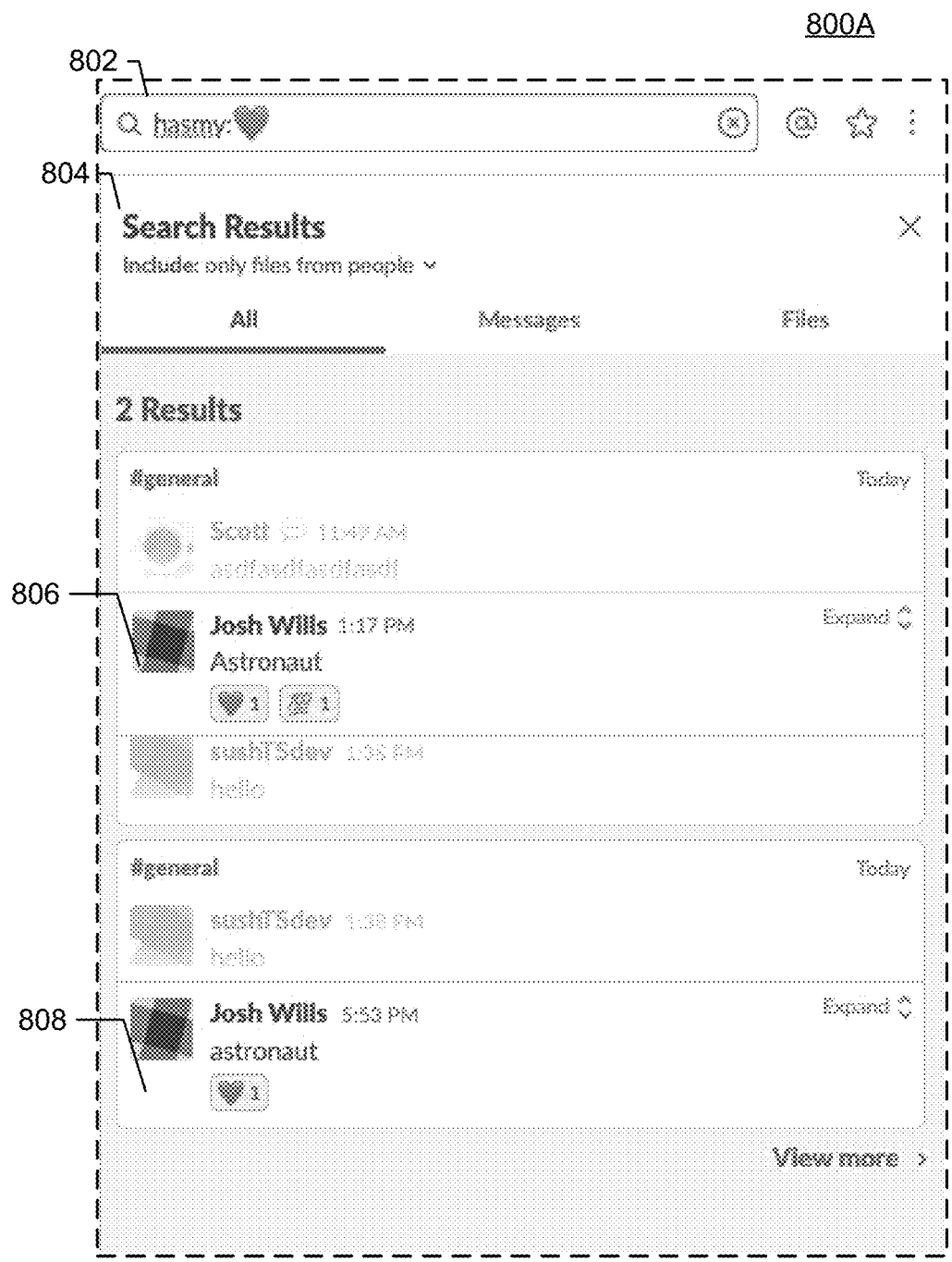
Figure 8B:
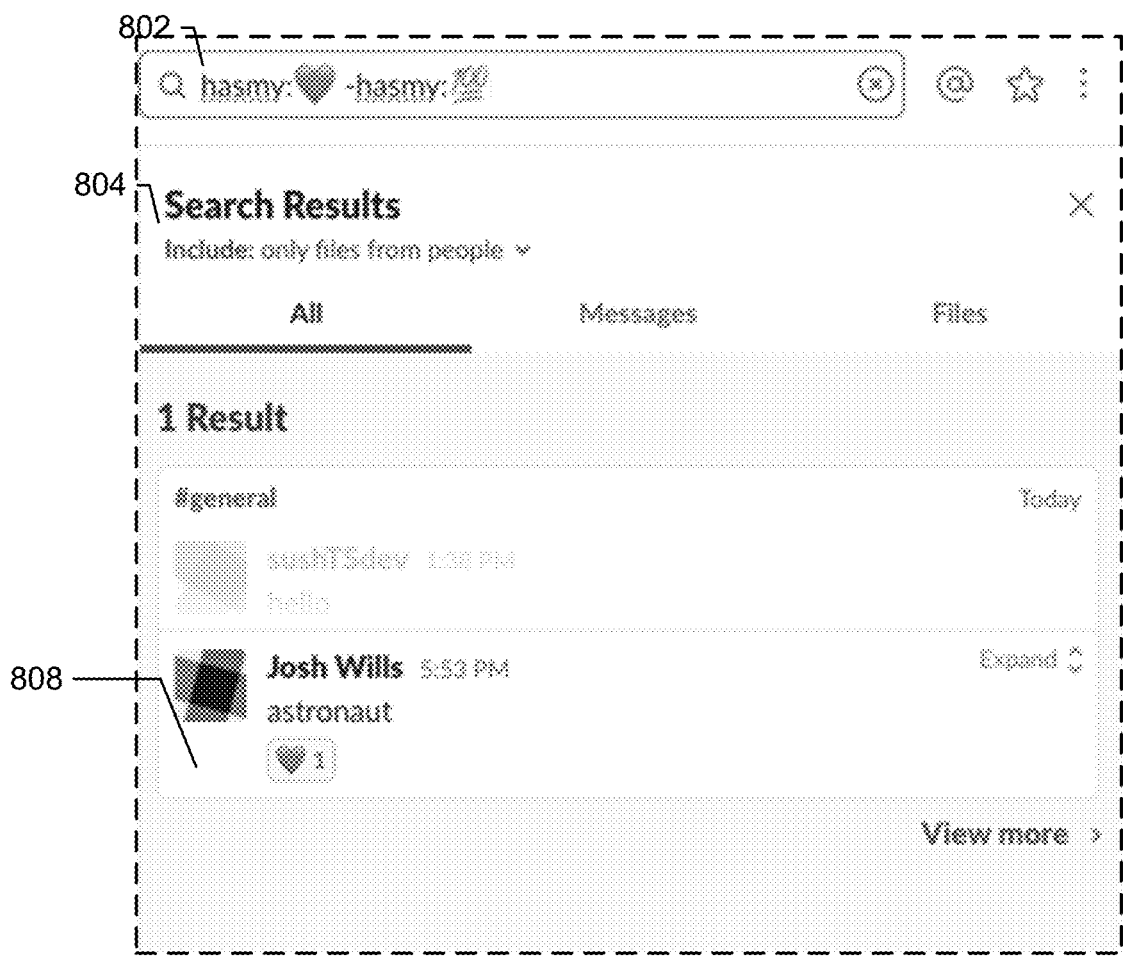

Having thus described some embodiments in general terms, references will now be made to the accompanying drawings, which are not necessarily drawn to scale, and wherein:

FIG. 1 is an example system architecture diagram illustrating a group-based communication platform in communication with client devices in accordance with some embodiments of the present invention;

FIG. 2 is an example system infrastructure diagram illustrating a message indexing server circuitry in accordance with some embodiments of the present invention;

FIG. 3 is an example process diagram in accordance with some embodiments of the present invention;

FIG. 4 is an example process diagram in accordance with some embodiments of the present invention;

FIG. 5 is an example data flow diagram in accordance with some embodiments of the present invention;

FIG. 6 is an example process diagram in accordance with some embodiments of the present invention;

FIG. 7 is an example data flow diagram in accordance with some embodiments of the present invention; and FIGS. 8A-8B illustrate various elements of example user interfaces in accordance with some embodiments of the present invention.

DETAILED DESCRIPTION OF VARIOUS EMBODIMENTS

Various embodiments of the present invention are described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present invention relate generally to message indexing and searching in network systems. More specifically, various embodiments of the present invention are related to a group-based communication platform that is capable of indexing metadata (such as metadata related to a reaction to an electronic message), and provide technical improvements in data management (such as index compiling and storage).

In a messaging platform, users may communicate with one another via various forms, such as text messages, voice messages, video messages, files, reactions, etc. Tagging reactions to electronic messages is becoming an increasingly popular way for users to respond to electronic messages posted by other users, thanks to the wide range of options that reactions provide. For example, a user John may post an electronic message suggesting a meeting time, and other users may tag a "thumbs up" reaction or a "thumbs down" reaction to the electronic message, which are indicative of whether the meeting time works for him or her. As another example, a user Tom may send an electronic message to his boss George seeking approval for a time off request, and George may respond to the electronic message with a "checkmark" reaction to indicate his approval.

However, indexing and management of messaging service data related to reactions is highly complex and fraught with technical challenges. Messaging platforms do not provide much scalability. When a large amount of electronic messages are exchanged within a short amount of time, messaging platforms can generate undue latency in indexing these electronic messages and responding to search queries associated with these electronic messages.

Due to limits in their system structure, messaging platforms are not capable of capturing relevant metadata associated with electronic messages when indexing these electronic messages. Because messaging platforms are not capable of indexing relevant metadata (such as these associated with reactions), messaging platforms are not capable of responding to search queries associated with reactions.

Continuing from the previous Tom/George example, George may use the "checkmark" reaction to indicate his approval for hundreds of requests. When George wants to identify what requests he has approved (i.e. responded with a "checkmark" reaction), he has to manually go through thousands of electronic messages, which would take up a huge amount of system processing time and network resources. This is without even considering the days or weeks that George might lose in weeding through such electronic messages.

Messaging platforms are also not capable of providing functionalities to enable a user to modify attributes of electronic messages that are not created by that user. Similarly, messaging platforms are not capable of responding to a search query that includes a request to retrieve electronic messages that a particular user reacted to in a certain way, especially when someone other than that particular user posted the associated message or submitted the search query at issue. Continuing from one of the examples in the prior paragraph, assuming that Alice responded to John's electronic message with a "thumbs down" reaction (i.e. an indicator that the suggested meeting time does not work for Alice), John may want to identify other electronic messages to which Alice has responded with a "thumbs up" reaction so that John can determine Alice's availability for the meeting. However, messaging platforms are structurally incapable of retrieving these electronic messages.

Some messaging platforms allow user to respond to an electronic message with multiple reactions. However, messaging platforms are not configured to distinguish these separate reactions which contributes to search difficulty. For example, a user may want to search for electronic messages that he or she has responded to with a "heart" reaction, but not with a "hundred points" reaction. Because messaging platforms do not distinguish these reactions, they are unable to provide accurate search results in response to such queries.

In contrast, systems structured in accordance with various embodiments of the invention provide specific, technical solutions to technical problems faced by messaging platforms. For example, various embodiments of the invention generate message indexes based not only on the electronic messages, but also on metadata associated with the electronic messages. Various embodiments of the invention also provide search functionality to handle search queries related to reactions, and generate a dynamic user interface to display the search results. Details of various embodiments of the present invention are described hereinafter.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "user" should be understood to refer to an individual, group of individuals, business, organization, and the like. The users referred to herein are accessing a group-based communication platform using client devices (as defined herein).

The term "user identifier" refers to an identifier that uniquely identifies information stored in a group-based communication platform that is related to a user. Information related to a user may be stored in a "user profile," "user account," or "user account details," which may include one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "group-based communication platform" refers to a system or virtual environment that has security sufficient such that it is accessible only to a defined group of user, thus enabling the defined group of users to communicate with each other through the system or virtual environment. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups. The group-based communication platform may take the form of one or more central servers disposed in communication with one or more additional servers running software applications, and having access to one or more databases storing digital content items, application-related data, and/or the like.

The term "group-based communication channel" refers to a virtual communication environment or feed that is configured to display messaging communications posted by channel members (e.g., validated users accessing the environment using client devices) that are viewable only to the members of the group. The format of the group-based communication channel may appear differently to different members of the group-based communication channel. However, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The terms "group-based communication channel identifier" or "channel identifier" refer to one or more items of data by which the group-based communication platform may use to identify a group-based communication channel. For example, a group-based communication channel identifier may comprise ASCII text, a pointer, a memory address, and the like.

The terms "group identifier" or "team identifier" refer to one or more items of data by which a group-based communication platform may use to identify a group within the group-based communication system. For example, a group identifier may comprise ASCII text, a pointer, a memory address, and the like.

The term "message sender identifier" identifies the sender (i.e., a client device associated with the particular user) that sends one or more electronic messages in the group-based communication platform. These electronic messages may be analyzed to determine context regarding the user (e.g., the user's expertise or interest in a topic may be determined based on the frequency of mention of the topic or key words associated with the topic within such messages). For example, a message sender identifier may comprise ASCII text, a pointer, a memory address, and the like.

As used herein, the terms "electronic message," "messaging communication," and "message" refer to any electronically generated digital content object provided by a user using a client device and that is configured for display within a group-based communication channel. Electronic message may include any text, image, video, audio or combination thereof provided by a user (using a client device). For instance, the user may provide an electronic message that includes text as well as an image and a video within the electronic message as message contents. In such a case, the text, image, and video would comprise the electronic message (or digital content object). Electronic messages may be stored into "message corpus." As used herein, the term "message corpus" refers to a collective depository of electronic messages.

As used herein, the term "reaction" or "graphic reaction" refers to a visual icon, avatar, image, video, photo, or graphic that may be used to label, tag, or otherwise distinguish a selected electronic message from other electronic messages in a group-based communication channel. In some embodiments, the reaction may provide a visual illustration of a sentiment or emotion that a user respond to a selected messaging communication. For instance, the graphic reaction may be an emoji, an emoticon, or other similar expressive visual identification means. In some embodiments, the graphic reaction may be animated, such as to illustrate movement between a first state and a second state when displayed within the selected group-based communication interface.

The term "metadata" refers to data that describes other data. For example, metadata may summarize basic information about other data. In various embodiments of the present invention, "message metadata" associated with an electronic message in a group-based communication channel may include a "reaction identifier" indicating graphical reaction to one of the plurality of electronic messages. As used herein, the term "reaction identifier" refers to one or more items of data by which a reaction may be identified by the group-based communication platform. For example, a reaction identifier may comprise ASCII text, an Unicode character or string, a numeric ID, a pointer, a memory address, and the like.

In various embodiments of the present invention, "message metadata" associated with an electronic message in a group-based communication channel may include "reaction sender identifier" that identifies the sender (i.e., a client device associated with the particular user) of a reaction. For example, a reaction sender identifier may comprise ASCII text, a pointer, a memory address, and the like.

In various embodiments of the present invention, a sentiment score may be associated with a graphical reaction, details of which are described hereinafter.

The term "message metadata set" refers to a collective depository of metadata associated with electronic messages. In various embodiments of the present invention, a message metadata set may include a group identifier, a message sender identifier, and a group-based communication channel identifier associated with each of the electronic messages. In some embodiments, the message metadata set also includes reaction identifiers and reaction sender identifiers associated with the electronic messages. In some embodiments, the message metadata set is stored in a single field on the corresponding electronic message, and a special separator character is used to distinguish various metadata (e.g. reaction identifiers, reaction sender identifiers, etc.) within the message metadata set.

The term "index" refers to a data structure that provides a collection of data and their associated fields. Using an index improves system response time when queried with data retrieval operations. For example, a "message index" enables a group-based communication platform to quickly locate electronic message(s) without having to retrieve every electronic message to determine if it matches the search query. Instead, the group-based communication platform queries the message index directly. A message index in various embodiments of the present invention provides search engine functionalities, which contains rules for taking an electronic message and its associated metadata, and converting the electronic message and its associated metadata into a stream of tokens before they are added to the message index.

The term "token" refers to a data object comprising one or more identifiers or pointers that represent an electronic message and/or associated reaction, including associated metadata. In one example, a token may indicate the occurrence of a particular term from a string of text. In various embodiments, a token may include a reaction identifier and a reaction sender identifier, separated by a separator, the details of which are described hereinafter.

The term "search query" refers to an information retrieval request to a search engine. A "search query" may be generated on one or more client devices, and may be transmitted to a group-based communication platform. For example, a search query associated with a message index may require retrieval of electronic message(s) based on the search criterion or criteria in the search query.

The term "reaction metadata criteria" refers to a search query that identifies electronic messages based on the message metadata. For example, a "reaction metadata criteria" may include a "targeted reaction identifier," which requests retrieval of electronic message(s) that a particular reaction is associated with. A "reaction metadata criteria" may also include a "targeted reaction sender identifier," which requests retrieval of electronic message(s) that a particular user reacted to (i.e. messages that a user has responded with a reaction). In response to the reaction metadata criteria, the group-based communication platform may generate a "reaction search results set," which indicates electronic messages that satisfy the reaction metadata criteria, details of which are described hereinafter.

Example System Architecture for Implementing Embodiments of the Present Invention Methods, apparatuses, and computer program products of the present invention may be embodied by any of a variety of devices. For example, the method, apparatus, and computer program product of an example embodiment may be embodied by a networked device (e.g., a group-based communication platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example system architecture 100 within which embodiments of the present invention may operate. Users may access a group-based communication platform 105 via a communication network 103 using client devices 101A-101N.

The client devices 101A-101N may be any computing device as defined above. Electronic data received by the group-based communication platform 105 from the client devices 101A-101N may be provided in various forms and via various methods. For example, the client devices 101A-101N may include desktop computers, laptop computers, smartphones, netbooks, tablet computers, wearables, and the like.

In embodiments where a client device of client devices 101A-101N is a mobile device, such as a smart phone or tablet, the client device may execute an "app" to interact with the group-based communication platform 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications.

Additionally or alternatively, the client devices 101A-101N may interact with the group-based communication platform 105 via a web browser. As yet another example, the client devices 101A-101N may include various hardware or firmware designed to interface with the group-based communication platform 105.

Communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 103 may include a cellular telephone, an 802.11, 802.16, 802.20, and/or WiMax network. Further, the communication network 103 may include a public network, such as the Internet, a private network, such as an intranet, or combinations thereof, and may utilize a variety of networking protocols including, but not limited to, TCP/IP based networking protocols. For instance, the networking protocol may be customized to suit the needs of the group-based communication platform 105. In some embodiments, the protocol is a custom protocol of JSON objects sent via a Websocket channel. In some embodiments, the protocol is JSON over RPC, JSON over REST/HTTP, and the like.

In various embodiments of the present invention, an electronic message or a search query may be sent to the group-based communication platform 105. In various implementations, the electronic message or the search query may be sent to the group-based communication platform 105 over communication network 103 directly by a client device of client devices 101A-101N. The electronic message or the search query may be also sent to the group-based communication platform 105 via an intermediary.

In some embodiments, the group-based communication platform 105 comprises a message server 107, a message indexing server 109, and one or more storages 117A-117N.

The message server 107 may be embodied as a computer or computers. The message server 107 may provide for receiving electronic data from various sources including, but not limited to, the client devices 101A-101N. For example, the message server 107 may be operable to receive and post or transmit group-based electronic messages provided by the client devices 101A-101N via communication network 103.

The message indexing server 109 generates and updates message indexes based on the electronic messages and their associated metadata provided to the group-based communication platform 105, and generates search results sets based on the search queries provided to the group-based communication platform 105. In some embodiments, the message indexing server 109 analyzes metadata associated with the electronic messages via the metadata interpreter component 111, generates and updates message indexes via the index compiler component 113, and performs search queries to a message index embedded in storages 117A-117N via the query analyzer component 115. As described above, the message index provides search engine functionalities.

The one or more storages 117A-117N may be embodied as a data storage device such as a Network Attached Storage (NAS) device or devices, or as a separate server or servers. In some embodiments, a message index (i.e. search engine) may be embedded in the one or more storages 117A-117N. The one or more storages 117A-117N include information accessible to the message server 107 and the message indexing server 109.

It is noted that various components in the message indexing server 109 may leverage the same computer or computing apparatus to perform the above-described operations. Similarly, various components of the message server 107 may leverage the same computer or computing apparatus to perform the above-described operations, and various components of the one or more storages 117A-117N may leverage the same computer or computing apparatus to perform the above-described operations.

Example Apparatus for Implementing Embodiments of the Present Invention

The message indexing server 109 of FIG. 1 may be embodied by one or more computing systems, such as apparatus 200 shown in FIG. 2. The apparatus 200 may include processor 202, memory 204, input/output circuitry 206, communications circuitry 208, metadata circuitry 210, index circuitry 212, and search query circuitry 214. The apparatus 200 may be configured to execute the operations described above with respect to FIG. 1 and below with respect to FIGS. 3-8B. Although these components 202-214 are described with respect to functional limitations, it should be understood that the particular implementations necessarily include the use of particular hardware. It should also be understood that certain of these components 202-214 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processor" or "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface circuitry and may include a display, which may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The metadata circuitry 210 includes hardware configured to analyze metadata associated with electronic messages, such as electronic messages from one or more client devices 101A-101N of FIG. 1. These metadata may include, for example, group identifiers, message sender identifiers, and group-based communication channel identifiers associated with these electronic messages. In some embodiments, these metadata may further include reaction identifiers and reaction sender identifiers associated with reactions to the electronic messages. The metadata circuitry 210 may utilize other circuitries, such as the processor 202 and memory 204, to perform these actions. However, it should also be appreciated that, in some embodiments, the metadata circuitry 210 may include a separate memory, processor, specially configured Field Programmable Gate Array (FPGA), or Application Specific Integrated Circuit (ASIC) for performing the functions described herein. The metadata circuitry 210 may be implemented using hardware components of the apparatus configured by either hardware or software for implementing these planned functions.

The index circuitry 212 includes hardware configured to generate message indexes. The index circuitry 212 may utilize processing circuitry, such as the processor 202, to perform these actions. The index circuitry 212 may receive data from the metadata circuitry 210. In some embodiments, the index circuitry 212 may include a separate processor, specially configured Field Programmable Gate Array (FPGA), or Application Specific Integrated Circuit (ASIC). In some implementations, the metadata circuitry 210 may be sub-circuitries belonging to the index circuitry 212. The index circuitry 212 may be implemented using hardware components of the apparatus configured by either hardware or software for implementing the functions described herein.

The search query circuitry 214 includes hardware configured to analyze search queries, including search queries associated with metadata. The search query circuitry 214 may utilize processing circuitry, such as the processor 202, to perform these actions. However, it should also be appreciated that, in some embodiments, the search query circuitry 214 may include a separate processor, specially configured Field Programmable Gate Array (FPGA), or Application Specific Integrated Circuit (ASIC) for performing the functions described herein. The search query circuitry 214 may be implemented using hardware components of the apparatus configured by either hardware or software for implementing these planned functions.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Data Flows of Embodiments of the Present Invention

Various methods described hereinafter provide technical improvements over computer functionalities. For example, various processes described herein improve indexing by generating message indexes and responding to search queries associated with metadata.

Generating and Updating Message Index

Referring to FIG. 3, an example process 300 for generating a message index in accordance with some embodiments of the present invention is shown.

The process 300 starts at block 301. At block 303, a server circuitry receives electronic messages and metadata associated with the electronic messages in a group-based communication platform. The server circuitry stores the received electronic messages in a message corpus, which may be embedded in one or more databases, such as the one or more storages 117A-117N of FIG. 1.

For example, a metadata circuitry, such as the metadata circuitry 210 of the message indexing server 109, may receive electronic messages from the client devices 101A-101N of FIGS. 1-2. The client devices 101A-101N may provide the following code describing an electronic message, substantially in the form of a (Secure) Hypertext Transfer Protocol ("HTTP(S)") POST message including eXtensible Markup Language ("XML") formatted data:

```
POST /authrequest.php HTTP/1.1
Host: www.server.com
Content-Type: Application/XML
Content-Length: 667
<?XML version = "1.0" encoding = "UTF-8"?>
<auth_request>
  <timestamp>2020-12-31 23:59:59</timestamp>
  <user_accounts_details>
    <user_account_credentials>
      <user_name>ID_user_1</user_name>
      <password>abc123</password>
      //OPTIONAL <cookie>cookieID</cookie>
      //OPTIONAL
  <digital_cert_link>www.mydigitalcertificate.com/
JohnDoeDaDoeDoe@gmail.com/mycertifcate.dc</digital_cert_link>
      //OPTIONAL
  <digital_certificate>_DATA_</digital_certificate>
    </user_account_credentials>
  </user_accounts_details>
  <client_details> //iOS Client with App and Webkit
    <client_IP>10.0.0.123</client_IP>
    <user_agent_string>Mozilla/5.0 (iPhone; CPU iPhone OS 7_1_1 like
Mac OS X) AppleWebKit/537.51.2 (KHTML, like Gecko) Version/7.0
Mobile/11D201 Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXXD</client_UDID>
    <client_OS>iOS</client_OS>
    <client_OS_version>7.1.1</client_OS_version>
    <client_app_type>app with webkit</client_app_type>
    <app_installed_flag>true</app_installed_flag>
    <app_name>MSM.app</app_name>
    <app_version>1.0 </app_version>
    <app_webkit_name>Mobile Safari</client_webkit_name>
    <client_version>537.51.2</client_version>
  </client_details>
  <client_details> //iOS Client with Webbrowser
    <client_IP>10.0.0.123</client_IP>
    <user_agent_string>Mozilla/5.0 (iPhone; CPU iPhone OS 7_1_1 like
Mac OS X) AppleWebKit/537.51.2 (KHTML, like Gecko) Version/7.0
Mobile/11D201 Safari/9537.53</user_agent_string>
    <client_product_type>iPhone6,1</client_product_type>
    <client_serial_number>DNXXX1X1XXXX(</client_serial_number>
    <client_UDID>3XXXXXXXXXXXXXXXXXXXXXXXXD</client_UDID>
    <client_OS>iOS</client_OS>
    <client_OS_version>7.1.1</client_OS_version>
    <client_app_type>web browser</client_app_type>
    <client_name>Mobile Safari</client_name>
    <client_version>9537.53</client_version>
  </client_details>
  <client_details> //Android Client with Webbrowser
    <client_IP>10.0.0.123</client_IP>
    <user_agent_string>Mozilla/5.0 (Linux; U; Android 4.0.4; en-us;
Nexus S Build/IMM76D) AppleWebKit/534.30 (KHTML, like Gecko)
Version/4.0 Mobile Safari/534.30</user_agent_string>
    <client_product_type>Nexus S</client_product_type>
    <client_serial_number>YXXXXXXXXZ</client_serial_number>
    <client_UDID>FXXXXXXXXX-XXXX-XXXX-XXXX-
XXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
  </client_details>
  <client_details> //Mac Desktop with Webbrowser
    <client_IP>10.0.0.123</client_IP>
    <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
    <client_product_type>MacPro5,1</client_product_type>
  <client_serial_number>YXXXXXXXXZ</client_serial_number>
    <client_UDID>FXXXXXXXXX-XXXX-XXXX-XXXX-
XXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
  </client_details>
  <message>
    <sender_identifier>5541263684</sender_identifier>
    <message_identifier>ID_message_10</message_identifier>
    <team_identifier>ID_team_1</team_identifier>
    <channel_identifier>ID_channel_1</channel_identifier>
    <contents>That is an interesting invention. I have attached a copy of
our patent policy.</contents>
    <attachments>patent_policy.pdf</attachments>
    <reaction>
      <sender_identifier>5541263684</sender_identifier>
      <reaction_identifier>5422</reaction_identifier>
    </reaction>
  </message>
</auth_request>
```

In the example above, an electronic message is sent by a client device via a web browser to the server circuitry. The content of the electronic message is "That is an interesting invention. I have attached a copy of our patent policy." Further, the electronic message is associated with a message metadata set. For example, the message metadata set includes a group identifier (or team identifier) "ID_team_1," a message sender identifier "5541263684," and a group-based communication channel identifier "ID_channel_1." As further shown above, the message metadata set also indicates a reaction identifier "5422" (which indicates a reaction associated with the electronic message) and a reaction sender identifier "5541263684" (which identifies the sender of the reaction).

As shown above, a reaction can be associated with different metadata, such as the reaction identifier and the reaction sender identifier. As described hereinafter, different algorithms may be used for generating tokens for the content of an electronic message itself (e.g. the text in the electronic message) and tokens for the reaction(s) to the electronic message. In some embodiments, all of the information (including metadata) related to an electronic message is stored in a single data record, which improves the efficiency of data retrieval from the search index.

At block 305, the server circuitry identifies metadata associated with electronic messages that are received by the server circuitry. Continuing from the example above, a metadata circuitry, such as the metadata circuitry 210 of the message indexing server 109, may identify metadata associated with the electronic message above, including the message sender identifier "5541263684," group identifier "ID_team_1," group-based communication channel identifier "ID_channel_1," reaction identifier "5422," and reaction sender identifier "5541263684."

As discussed above, the message metadata set may include a reaction identifier indicating graphical reaction to one of the plurality of electronic messages, and a reaction sender identifier associated with the reaction identifier. Continuing from the previous example, if a user reacts to the message "That is an interesting invention. I have attached a copy of our patent policy" with a "heart" reaction, then the associated metadata includes reaction identifier (for example, the reaction identifier "5422") that indicates a "heart" reaction to the electronic message, as well as a reaction sender identifier (for example, the reaction sender identifier "5541263684") associated with the "heart" reaction, which indicates the identity of the user who reacted to the electronic message with a "heart" reaction.

In various embodiments of the present invention, the electronic message may include metadata such as a message identifier, message hierarchy data (e.g., the message may be a reply to another message), third party metadata, and/or the like.

At block 307, the server circuitry generates message index based on the electronic messages and the metadata associated with the electronic messages. Continuing from the previous example, a server circuitry, such as the index circuitry 212 of the message indexing server 109, may generate an index for the electronic message "That is an interesting invention. I have attached a copy of our patent policy," and the message index includes metadata associated with reaction(s) (such as the "heart" reaction) to the electronic message.

In various embodiments of the present invention, electronic messages and their associated metadata are converted into a stream of tokens and stored in the message index. These tokens include reaction identifiers and reaction sender identifiers. In some embodiments, the tokens provide direct mapping to the underlying reaction identifiers and the reaction sender identifiers. For example, a server circuitry, such as the index circuitry 212, may execute the following code (substantially in the form of JavaScript) that causes the generation of metadata field (including a reaction identifier and a reaction sender identifier) in the message index:

```
static String solrFeedBuildReactionField(ReactionsProjection row) {
    if (row.getName( ) == null || row.getName( ).isEmpty( ) || !row.isSetUserId( )) {
        return null;
    }
    String reactionName = row.getName( );
    int idx = reactionName.indexOf("::skin-tone-");
    if (idx >= 0) {
        reactionName = reactionName.substring(0, idx);
    }
    return reactionName + SOLR_FEED_ATTACHMENT_SEPARATOR +
        row.getUserId( ) ;
}
```

In some embodiments, each token in the stream of tokens would include the name of a reaction, a non-printable separator character, and a user ID. For example, ["+1☐2180504292", "ok☐02180504", "smile☐1838793", "heart☐828394"] is a stream of tokens that includes a token for a "ok" reaction with a user ID "2180504," a token for a "smile" reaction with a user ID 1838793, etc.

The process 300 ends at block 309.

Referring to FIG. 4, an example process 400 for updating message index in accordance with some embodiments of the present invention is shown.

The process 400 starts at block 402. At block 404, the server circuitry receives at least one additional message metadata set associated with the electronic messages. In some embodiments, the additional message metadata sets comprise additional reaction identifiers and additional reaction sender identifiers. For example, a metadata circuitry, such as the metadata circuitry 210 of the message indexing server 109, may receive additional user reactions to electronic messages, such as a "hundred points" reaction or a "thumbs up" reaction. Each of the additional reaction is also associated with a sender of that reaction (i.e. a corresponding additional reaction sender identifier).

In various embodiments of the present invention, a user may input a request to add a reaction to a message via a client device, such as one of the client devices 101A-101N described above with reference to FIG. 1. For example, the user may input his request to add a reaction via an app that executes on the operating system of the client device. As another example, the user may input his request via a web interface. When the request to add a reaction is received, the client device may initialize a mapping of reaction identifiers to the reactions. In some embodiments, the reactions may be natively supported by the operating system of the client device. In some embodiments, the client device may download graphical reactions from a remote server to the client device.

In various embodiments of the present invention, when a selection of a reaction is received from the user, the client device identifies a match between the selected reaction and a corresponding reaction identifier based on the mapping of reaction identifiers to the reactions (as described above). In some embodiments, a prefix tree (or "trie") is generated, and the client device may filter down the prefix tree to identify the match.

In various embodiments of the present invention, after a reaction is added to a message, the client device may transmit an indication to the message server (such as the message server 107 described above with reference to FIG. 1), which indicates that a reaction has been added to the electronic message. The indication includes an additional message metadata set described above, which comprises an additional reaction identifier and an additional reaction sender identifier. The message server may further identify other client devices associated with the communication channel through which the reaction is added, and transmit indications to these client devices. Each client device then initializes a mapping of reaction identifiers to the reactions so that the reaction is displayed on each client device.

At block 406, after receiving at least one additional message metadata set associated with the electronic messages, the server circuitry generates a job queue for processing the additional message metadata sets. The job queue is a data structure that contains jobs that need to be completed, and may be embodied in one or more computers or computing apparatus, such as the server circuitry. The job queue allows the server circuitry to monitor metadata that need to be process, assign priorities for these jobs, and share necessary computer resources. For example, when the server circuitry receives a huge amount of metadata associated with the electronic messages within a short period of time, creating a job queue helps the server circuitry to process these metadata without overburdening the server circuitry.

At block 408, the server circuitry identifies an electronic message that is associated with the additional reaction identifiers based on a group-based communication channel identifier and a message time stamp from the metadata associated with the reactions. Continuing from the previous example, after receiving the "hundred points" reaction, the server circuitry may identify an electronic message (for example, "Astronaut") based on the channel identifier "123456" and the message time stamp "2018-01-01 1:17 PM." In other words, the "hundred points" reaction is associated with a particular electronic message ("Astronaut") in a channel that has an identifier "123456."

At block 410, the server circuitry updates the message index based on the additional reaction identifiers and additional reaction sender identifiers after identifying the corresponding electronic messages. In some embodiments, the server circuitry may first retrieve the electronic message and its associated metadata associated with an additional reaction identifier. The server circuitry then modifies the electronic message by injecting a reaction identifier and a corresponding reaction sender identifier to the electronic message. The server circuitry further re-indexes the electronic message by adding the modified electronic message to the message index and removing the previous copy of the electronic message. Continuing from the previous example, the server circuitry may update the message index associated with the "Astronaut" message to include the additional "hundred points" reaction to the electronic message.

At block 412, the server circuitry determines whether all jobs in the job queue have been performed. In other words, the server circuitry determines whether all the additional metadata sets have been processed to update the message index. If not, then process 400 returns to block 408, where the server circuitry continues to identify electronic messages based on unprocessed additional metadata sets.

The process 400 ends at block 414.

Referring to FIG. 5, a data flow chart 500 for updating message index in accordance with some embodiments of the present invention is shown. As described above in connection with block 406 of FIG. 4, a server circuitry may create a job queue 501 for processing additional metadata sets. For example, the job queue 501 may include a reaction identifier 503, a reaction sender identifier 505, a message time stamp 507, and a group-based communication channel identifier 509 associated with an additional metadata set.

The additional metadata sets may be processed in a metadata indexing server, such as the message indexing server 109 as shown in FIGS. 1-2 and partially reproduced on FIG. 5. Specifically, the metadata circuitry 210 of the message indexing server 109 processes the additional message metadata sets in the job queue 501, and identifies electronic messages stored in the one or more storages 117A-117N. For example, as described above in connection with block 408 of FIG. 4, the metadata circuitry 210 may first obtain a group-based communication channel identifier 509 and a message time stamp 507 associated with a reaction identifier 503, and then use the group-based communication channel identifier 509 and the message time stamp 507 to retrieve an electronic message associated with the reaction identifier 503.

After the corresponding electronic message is identified, the index circuitry 212 of the message indexing server 109 may update the message index 511 based on the additional metadata set and the corresponding electronic message. For example, as described above in connection with block 410 of FIG. 4, the index circuitry 212 may inject the reaction identifier 503 and the corresponding reaction sender identifier 505 to the electronic message in the message index 511.

In various embodiments of the present invention, the updated message index 511 may be stored in one of the storages 117A-117N.

Responding to Metadata Search Queries

Referring to FIG. 6, an example process 600 for generating a reaction search results set in response to metadata search query associated with electronic messages in accordance with some embodiments of the present invention is shown. In some embodiments, the electronic messages are stored in a message corpus, which may be embedded in one or more databases, such as the storages 117A-117N of FIG. 1.

The process 600 starts at block 602. At block 604, a server circuitry may receive a search query associated with the electronic messages. The search query may be generated by one or more client devices, such as the client devices 101A-101N. In some embodiments, the search query may include metadata criteria (such as reaction metadata criteria), and the server circuitry may identify the reaction metadata criteria from the search query.

For example, a search query circuitry, such as the search query circuitry 214 of the message indexing server 109, may receive a search query associated with the electronic messages from the client devices 101A-101N with reference to FIGS. 1-2. The search query may include reaction metadata criteria associated with one or more reactions.

In some embodiments, the reaction metadata criteria includes a targeted reaction identifier. The targeted reaction identifier indicates a particular reaction that is associated with the plurality of electronic messages. For example, when a search query includes a targeted reaction identifier associated with "heart" reaction, it requests retrieval of electronic messages that has been associated with a "heart" reaction.

In some embodiments, the reaction metadata criteria includes a targeted reaction sender identifier. The targeted reaction sender identifier indicates a user who may be associated with the reaction(s) to the electronic messages.

For example, when a search query includes a targeted reaction sender identifier associated with a user Frank, it requests retrieval of electronic messages that Frank has responded to (i.e. sent a reaction to).

At block 606, a server circuitry may analyze the search query. Continuing from the previous example, a search query circuitry, such as the search query circuitry 214 of the message indexing server 109, may use the message index associated with the electronic messages to retrieve electronic messages where Frank has tagged with a "heart" reaction. The message index may be generated and updated in accordance with embodiments described above in connection with FIGS. 3-5.

In some embodiments of the invention, when the search query comprises reaction metadata criteria that include a targeted reaction identifier, the server circuitry may compare the targeted reaction identifier to the message metadata sets associated with the plurality of electronic messages of the message corpus. For example, the search query may include a targeted reaction identifier associated with "heart" reaction (i.e. requesting retrieval of electronic messages that has been associated with a "heart" reaction), and the server circuitry may compare the "heart" reaction to the message metadata sets to identify electronic messages that have been reacted to with a "heart" reaction.

In some embodiments of the invention, when the search query comprises reaction metadata criteria that includes a targeted reaction identifier and a targeted reaction sender identifier, the server circuitry may compare the targeted reaction identifier and the targeted reaction sender identifier to the message metadata sets associated with the plurality of electronic messages of the message corpus. For example, a search query includes a targeted reaction identifier associated with "heart" reaction and a targeted reaction sender identifier associated with a user Frank (i.e. requesting retrieval of electronic messages that Frank has responded to with a "heart" reaction), and the server circuitry may compare the "heart" reaction and the user identifier of Frank to the message metadata sets to identify electronic messages that Frank has reacted to with a "heart" reaction.

In some embodiments of the invention, the search query may comprise metadata criteria that indicate Boolean logic. Boolean logic can be expressed using Boolean operators (e.g. OR, AND, NOT), which refine search by indicating relationship between search terms. For example, the search query may request retrieval of electronic messages where a user Susan has responded with a "heart" reaction, but not a "hundred points" reaction. In this example, a search query circuitry, such as the search query circuitry 214 of the message indexing server 109, analyzes the Boolean logic in the search query, and retrieves electronic messages based on the Boolean logic in the search query.

In some embodiments of the invention, the search query may comprise reaction metadata criteria that indicate a sentiment score value or threshold. A sentiment score is a numerical representation of the sentiment polarity of a reaction. For example, the sentiment score of a "thumbs up" reaction may be higher than the sentiment score of a "thumbs down" reaction, which shows that a "thumbs up" reaction is more positive than a "thumbs down" reaction. In some embodiments of the invention, each available reaction of the group-based communication platform is assigned a sentiment score. When the search query indicates a sentiment score value, a search query circuitry, such as the search query circuitry 214 of the message indexing server 109, identifies reaction(s) that match the sentiment score value and retrieves electronic messages based on reaction identifier(s) corresponding to the reaction(s). When the search query indicates a sentiment score threshold, a search query circuitry, such as the search query circuitry 214 of the message indexing server 109, identifies reaction(s) that satisfy the sentiment score threshold and retrieves electronic messages based reaction identifier(s) corresponding to the reaction(s).

In some embodiments, the message index assigns an integer identifier to each message metadata set (for example, a pair of a reaction identifier and a reaction sender identifier), and stores a mapping between the integer identifier and the token associated with the message metadata set. In analyzing the search query, the server circuitry converts the search query from text to tokens, and retrieves lists of integer identifiers for each token by looking up those tokens in the message index. The server circuitry may further merger the lists of integer identifiers using Boolean logic to generate a final list of integer identifiers, which matches the reaction metadata criteria imposed by the search query. In some embodiments, the server circuitry may further provide a ranked final list based on relevance and/or message time stamp, and generate a search results set based on the ranked final list.

In some embodiments, the integer identifier for each message metadata set is internal to the server circuitry, and the "reaction identifier" and the "reaction sender identifier" of each message metadata set is externally provided to the server circuitry. In other words, the integer identifier is only used in the message index, and the "reaction identifier" and the "reaction sender identifier" are used by various components of the group-based communication platform, including, for example, the client devices 101A-101N with reference to FIG. 1. By doing so, the integer identifier provides the technical benefit of additional filtering in the search results set. For example, when a search query is received, the server circuitry may convert the search query to a stream of tokens (for example, the reaction that the user wants to search followed by a non-printable separator character and a user ID for the reaction), and utilize the mapping between the integer identifier and the token associated with the message metadata set to generate search results set.

At block 608, the server circuitry may transmit a reaction search results set based on the electronic messages retrieved in response to the search query. The reaction search results set indicates one or more electronic messages satisfying the metadata criteria. Continuing from one of the previous examples, the search query may request retrieval of electronic messages which the user Susan has responded with a "heart" reaction, but not a "hundred points" reaction. In this example, a search query circuitry, such as the search query circuitry 214 of the message indexing server 109, retrieves electronic messages at block 606, and generates reaction search results set based on the retrieved electronic messages at block 608.

In some embodiments of the invention, the search results may be displayed via a dynamic user interface in a client device based on the search results set, details of which are discussed hereinafter in connection with FIGS. 8A-8B.

The process 600 ends at block 610.

Referring now to FIG. 7, a data flow diagram 700 for generating response to search query is shown. As described above in connection with block 604 of FIG. 6, one or more user devices, such as client devices 101A-101N described in FIG. 1, may generate a search query 701. The search query 701 may include a targeted reaction identifier 703, a targeted reaction sender identifier 705, Boolean logic 707, etc. For example, a client device may generate a search query to identify electronic messages which a user Susan has responded with a "heart" reaction, but not a "hundred points" reaction.

The search query 701 may be received and processed in a metadata indexing server, such as the message indexing server 109 as shown in FIGS. 1-2 and partially reproduced on FIG. 7. Specifically, the search query circuitry 214 of the message indexing server 109 may analyze the search query 701, as described above in connection with block 604 of FIG. 6. Continuing from the previous example, the search query circuitry 214 analyzes the search query 701 and identifies targeted reaction sender identifier 705 (e.g. associated with the user Susan), targeted reaction identifier(s) 703 (e.g. associated with the "heart" reaction and the "hundred points" reaction), and the Boolean logic 707 (e.g. the "NOT" or "−" operator that connected the two reaction identifiers).

The search query circuitry 214 identifies electronic message(s) from the one or more storages 117A-117N based on the analysis of the search query 701 and the message index 709, as described above in connection with block 606 of FIG. 6. Continuing from the previous example, the search query circuitry 214 queries the message index 709 to identify electronic message(s) where the user Susan has responded with a "heart" reaction but not a "hundred points" reaction.

After the electronic messages are retrieved, the search query circuitry 214 of the message indexing server 109 may generate a reaction search results set 711 and transmit the reaction search results set 711 to the one or more client devices 101A-101N that initiated the search query 701.

Dynamic User Interface (UI)

FIGS. 8A-8B illustrate various elements of example user interfaces according to some embodiments of the present invention.

Referring now to FIG. 8A, an example user interface 800A is shown. The user interface 800A dynamically displays search results and can be generated by a client device, such as client devices 101A-101N. The user interface 800A includes a search input box 802, which allows a user to input search queries. As shown in FIG. 8A, a search query "hasmy::heart:" is typed in the search input box 802, which requests retrieval of electronic messages which the user has responded with a "heart" reaction.

A server circuitry, such as the search query circuitry described above in connection with FIGS. 6-7, analyzes the search query to identify metadata criteria. For example, the server circuitry identifies a reaction identifier corresponding to the "heart" reaction. The server circuitry also identifies the reaction sender identifier associated with the to-be-searched reaction. Here, "hasmy" indicates that reaction sender identifier should correspond to the user who input the search query.

Based on the results obtained from querying the message index, the server circuitry generates a search results set and transmits the search result set to the client device. The client device dynamically generates the user interface 800A to show electronic messages satisfying the metadata criteria of the search query. For example, the search result list 804 highlights two electronic messages 806 and 808, which the user has responded with a "heart" reaction.

Referring now to FIG. 8B, an updated user interface 800B in response to an updated search query is shown. As shown in the search input box 802, the updated search query is "hasmy::heart: −hasmy::hundredpoints:" which requires retrieval of electronic messages where the user has responded with a "heart" reaction but not with a "hundred points" reaction. While the updated search query is typed into the search input box 802, a server circuitry, such as the search query circuitry described above in connection with FIGS. 6-7, analyzes the updated search query, queries the message index, and generates an updated search results set. Upon receiving the updated search results set, the user device generates the updated user interface 800B, which highlights the electronic messages 808, which the user has responded with a "heart" reaction, but not a "hundred points" reaction.

In some embodiments of the invention, the dynamic user interface may provide visualization of search results. For example, the user interface may provide a dashboard that displays results with options for customization, such as sorting results based on date, channel, etc. The user interface may also provide a time series chart showing the distribution of search results at successive intervals of time. For example, when a user George inputs a search query for electronic messages that he has tagged with a "checkmark" reaction, the dynamic user interface may display a time series chart showing a trend in the quantity of electronic messages which George has responded with a "checkmark" reaction, in addition to a list of electronic messages that satisfy the search query.

In some embodiments of the invention, the client device may generate filter in the dynamic user interface to facilitate quick search. For example, the filter may include options, and each option corresponds to a commonly used reaction by the user. When the dynamic user interface receives a user selection of a filter option, the dynamic user interface generates a search query to request retrieval of electronic messages where the user has tagged with a reaction that corresponds to the filter option.

Additional Implementation Details

Although example processing systems have been described in FIGS. 1-2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Conclusion

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed:

1. An apparatus comprising at least one processor and at least one non-transitory memory comprising program code, the at least one non-transitory memory and the program code configured to, with the at least one processor, cause the apparatus to at least:
    generate a message corpus based on a plurality of electronic messages, wherein each of the plurality of electronic messages is associated with a message metadata set, each message metadata set comprising:
        a group identifier,
        a message sender identifier,
        a group-based communication channel identifier, and
    wherein at least some message metadata sets associated with respective electronic messages of the plurality of electronic messages further comprise:
        a reaction identifier, and
        a reaction sender identifier;
    generate a message index based on the message corpus;
    receive a search query associated with the message index, wherein the search query comprises reaction metadata criteria; and
    apply the search query to the message index to generate a reaction search results set, wherein the reaction search results set is determined at least in part by comparing, based on the message index, the reaction metadata criteria to the message metadata sets associated with the plurality of electronic messages of the message corpus.

2. The apparatus of claim 1, wherein the reaction metadata criteria comprises a targeted reaction identifier, and wherein the reaction search results set is determined at least in part by comparing, based on the message index, the targeted reaction identifier to the message metadata sets associated with the plurality of electronic messages of the message corpus.

3. The apparatus of claim 2, wherein the reaction metadata criteria further comprises a targeted reaction sender identifier, and wherein the reaction search results set is determined at least in part by comparing, based on the message index, the targeted reaction identifier and the targeted reaction sender identifier to the message metadata sets associated with the plurality of electronic messages of the message corpus.

4. The apparatus of claim 2, wherein each of the at least some message metadata sets further comprises a sentiment score associated with the reaction identifier, wherein the reaction metadata criteria indicates a sentiment score threshold.

5. The apparatus of claim 2, wherein the at least one non-transitory memory and the program code configured to, with the at least one processor, cause the apparatus to further:
    receive at least one additional message metadata set associated with the plurality of electronic messages, wherein the at least one additional message metadata set comprises additional reaction identifiers and additional reaction sender identifiers; and
    update the message index based on the at least one additional message metadata set.

6. The apparatus of claim 5, wherein updating the message index comprises:
    generating a job queue associated with the at least one additional message metadata set; and
    generating an updated message index based on the message index and the job queue.

7. The apparatus of claim 6, wherein generating the updated message index further comprises:
    identifying a corresponding group-based communication channel identifier and a corresponding message time stamp associated with an additional reaction identifier of the additional reaction identifiers;
    identifying an electronic message from the message corpus based on the corresponding group-based communication channel identifier and the message time stamp; and
    generating a modified electronic message by injecting the additional reaction identifier and a corresponding reaction sender identifier to the electronic message.

8. A computer-implemented method, comprising:
    generating a message corpus based on a plurality of electronic messages, wherein each of the plurality of electronic messages is associated with a message metadata set, each message metadata set comprising:
        a group identifier,
        a message sender identifier,
        a group-based communication channel identifier, and
    wherein at least some message metadata sets associated with respective electronic messages of the plurality of electronic messages further comprise:
        a reaction identifier, and
        a reaction sender identifier;
    generating a message index based on the message corpus;
    receiving a search query associated with the message index, wherein the search query comprises reaction metadata criteria; and
    applying the search query to the message index to generate a reaction search results set, wherein the reaction search results set is determined at least in part by comparing, based on the message index, the reaction metadata criteria to the message metadata sets associated with the plurality of electronic messages of the message corpus.

9. The computer-implemented method of claim 8, wherein the reaction metadata criteria comprises a targeted reaction identifier, and wherein the reaction search results set is determined at least in part by comparing, based on the message index, the targeted reaction identifier to the message metadata sets associated with the plurality of electronic messages of the message corpus.

10. The computer-implemented method of claim 9, wherein the reaction metadata criteria further comprises a targeted reaction sender identifier, and wherein the reaction search results set is determined at least in part by comparing, based on the message index, the targeted reaction identifier and the targeted reaction sender identifier to the message metadata sets associated with the plurality of electronic messages of the message corpus.

11. The computer-implemented method of claim 9, wherein each of the at least some message metadata sets further comprises a sentiment score associated with the reaction identifier, wherein the reaction metadata criteria indicates a sentiment score threshold.

12. The computer-implemented method of claim 9, wherein the computer-implemented method further comprises:
   receiving at least one additional message metadata set associated with the plurality of electronic messages, wherein the at least one additional message metadata set comprises additional reaction identifiers and additional reaction sender identifiers; and
   updating the message index based on the at least one additional message metadata set.

13. The computer-implemented method of claim 12, wherein updating the message index comprises:
   generating a job queue associated with the at least one additional message metadata set; and
   generating an updated message index based on the message index and the job queue.

14. The computer-implemented method of claim 13, wherein generating the updated message index further comprises:
   identifying a corresponding group-based communication channel identifier and a corresponding message time stamp associated with an additional reaction identifier of the additional reaction identifiers;
   identifying an electronic message from the message corpus based on the corresponding group-based communication channel identifier and the message time stamp; and
   generating a modified electronic message by injecting the additional reaction identifier and a corresponding reaction sender identifier to the electronic message.

15. A computer program product comprising at least one non-transitory computer-readable storage medium having computer-readable program code portions stored therein, the computer-readable program code portions comprising an executable portion configured to:
   generate a message corpus based on a plurality of electronic messages, wherein each of the plurality of electronic messages is associated with a message metadata set, each message metadata set comprising:
      a group identifier,
      a message sender identifier,
      a group-based communication channel identifier, and
   wherein at least some message metadata sets associated with respective electronic messages of the plurality of electronic messages further comprise:
      a reaction identifier, and
      a reaction sender identifier;
   generate a message index based on the message corpus;
   receive a search query associated with the message index, wherein the search query comprises reaction metadata criteria; and
   apply the search query to the message index to generate a reaction search results set, wherein the reaction search results set is determined at least in part by comparing, based on the message index, the reaction metadata criteria to the message metadata sets associated with the plurality of electronic messages of the message corpus.

16. The computer program product of claim 15, wherein the reaction metadata criteria comprises a targeted reaction identifier, and wherein the reaction search results set is determined at least in part by comparing, based on the message index, the targeted reaction identifier to the message metadata sets associated with the plurality of electronic messages of the message corpus.

17. The computer program product of claim 16, wherein the reaction metadata criteria further comprises a targeted reaction sender identifier, and wherein the reaction search results set is determined at least in part by comparing, based on the message index, the targeted reaction identifier and the targeted reaction sender identifier to the message metadata sets associated with the plurality of electronic messages of the message corpus.

18. The computer program product of claim 16, wherein each of the at least some message metadata sets further comprises a sentiment score associated with the reaction identifier, wherein the reaction metadata criteria indicates a sentiment score threshold.

19. The computer program product of claim 16, wherein the computer-readable program code portions comprising the executable portion configured to further:
   receive at least one additional message metadata set associated with the plurality of electronic messages, wherein the at least one additional message metadata set comprises additional reaction identifiers and additional reaction sender identifiers; and
   update the message index based on the at least one additional message metadata set.

20. The computer program product of claim 19, wherein updating the message index comprises:
   generating a job queue associated with the at least one additional message metadata set; and
   generating an updated message index based on the message index and the job queue.

* * * * *

UNITED STATES PATENT AND TRADEMARK OFFICE
CERTIFICATE OF CORRECTION

PATENT NO. : 10,630,627 B2
APPLICATION NO. : 16/010891
DATED : April 21, 2020
INVENTOR(S) : Joshua Wills et al.

Page 1 of 1

It is certified that error appears in the above-identified patent and that said Letters Patent is hereby corrected as shown below:

On the Title Page

Item (54) and in the Specification, Column 1, Line 3, change "Group Based" to --Group-Based--.

Signed and Sealed this
Twenty-sixth Day of May, 2020

Andrei Iancu
*Director of the United States Patent and Trademark Office*